Jan. 19, 1965 K. C. AGRELIUS 3,166,711

DUAL DIVERSITY SWITCHING UNIT

Filed Feb. 24, 1961 2 Sheets-Sheet 1

INVENTOR.
KELTON C. AGRELIUS

BY George J. Rubens
ATTORNEY

Jan. 19, 1965 K. C. AGRELIUS 3,166,711
DUAL DIVERSITY SWITCHING UNIT
Filed Feb. 24, 1961 2 Sheets-Sheet 2
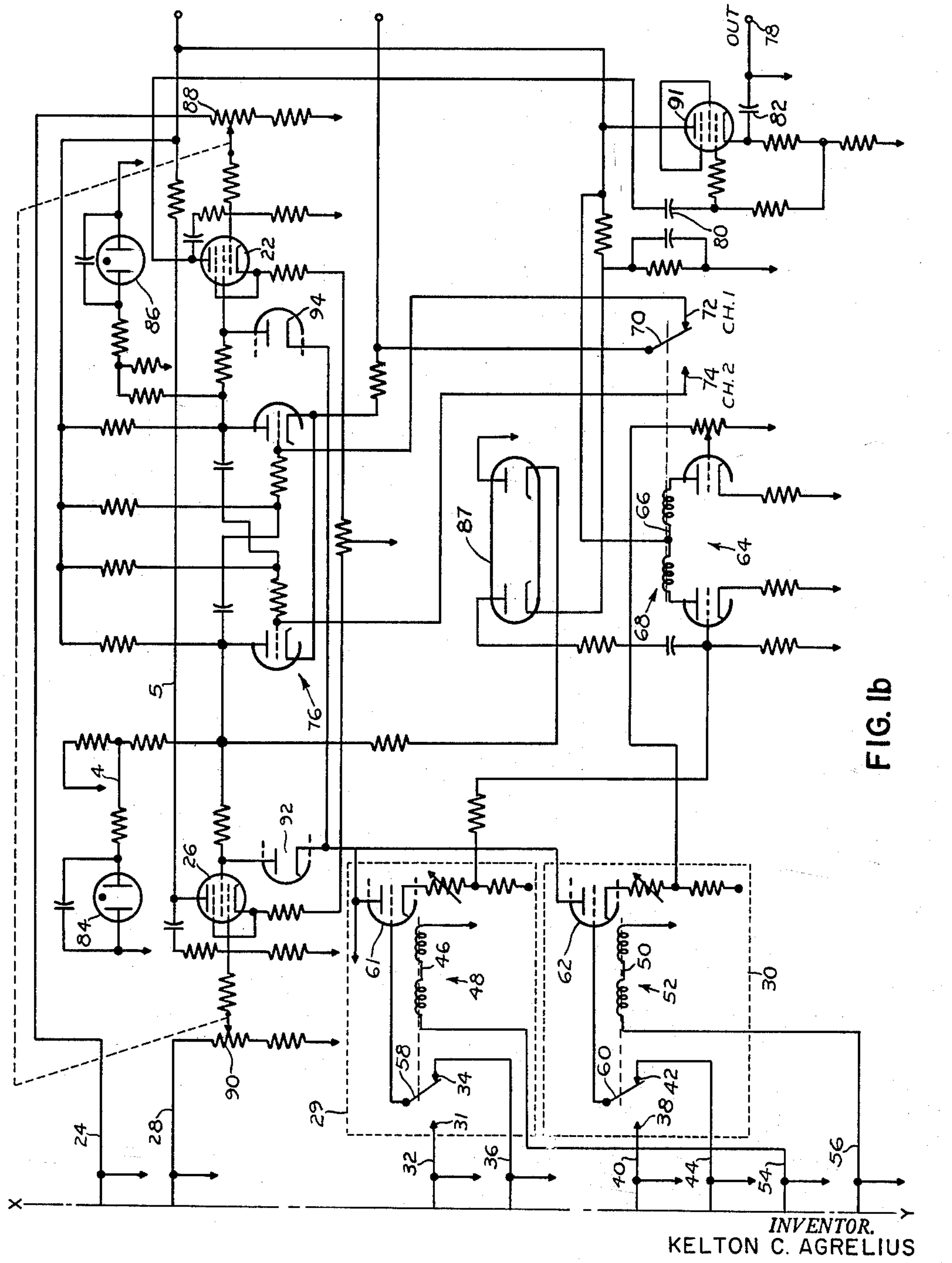
FIG. Ib
INVENTOR.
KELTON C. AGRELIUS
BY
George J. Rubens
ATTORNEY 3,166,711

DUAL DIVERSITY SWITCHING UNIT

Kelton Casper Agrelius, Camarillo, Calif., assignor to the United States of America as represented by the Secretary of the Navy Filed Feb. 24, 1961, Ser. No. 91,552
5 Claims. (Cl. 325—304)
(Granted under Title 35, U.S. Code (1952), sec. 266)

Figure 1A:
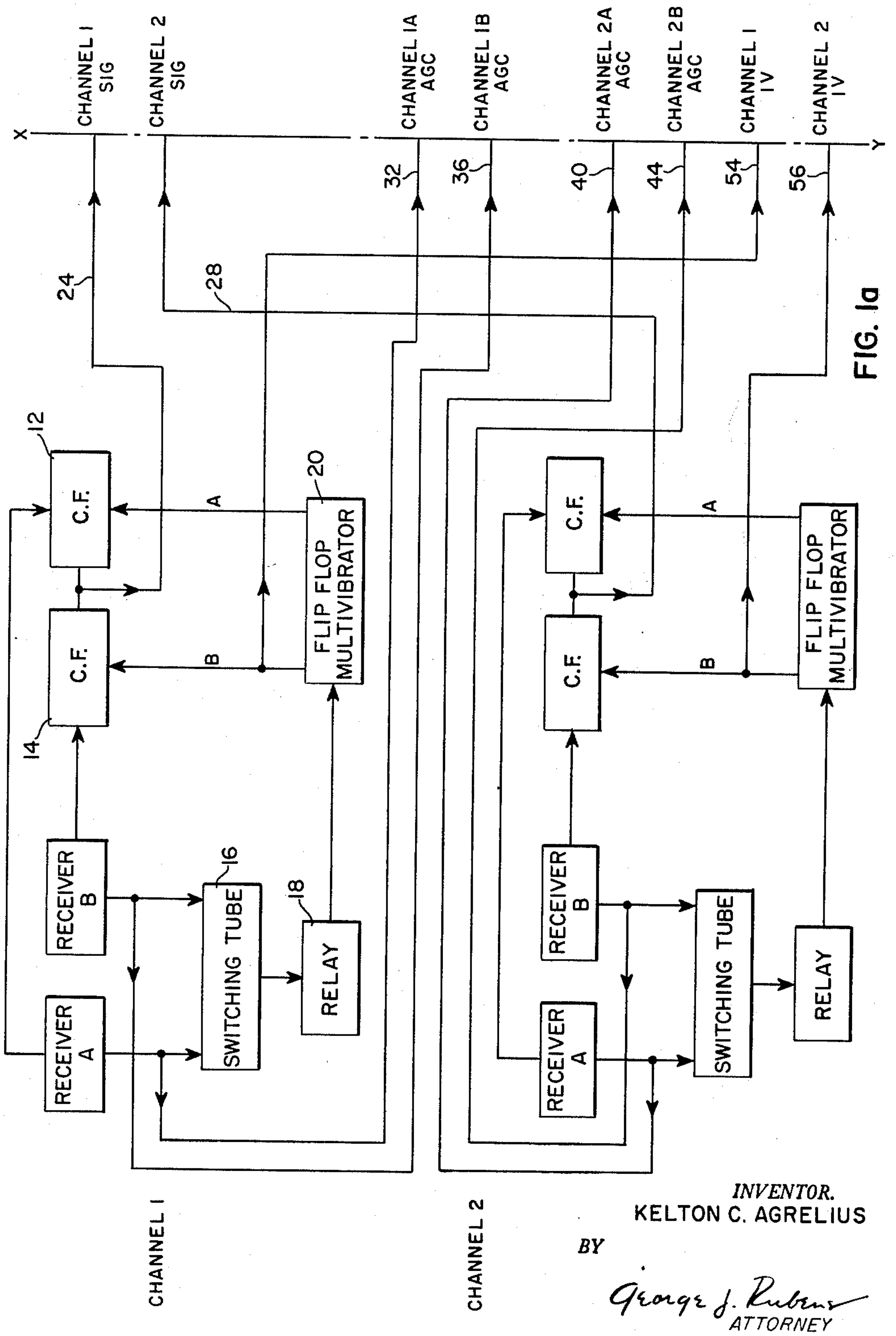

The invention described herein may be manufactured and used by or for the Government of the United States of America for governmental purposes without the payment of any royalties thereon or therefor.

The present invention relates to a dual diversity switching unit, and more particularly to a switching unit which selects the strongest signal from at least four different receivers, each receiver receiving a signal through an antenna which is in diversity with the remainder of the antennas.

It has generally been known that by physically separating at least two antennas in a horizontal and/or vertical direction from one another that it is unlikely that fading will occur at both antennas at the same time. This principle, known as the diversity effect, has been utilized for acquiring a better signal by either combining the outputs of the receivers or selecting the strongest signal from one of such receivers. The present invention is a new and novel switching unit which will select the strongest signal from at least four different antennas all placed in diversity, each antenna being coupled to a respective receiver. The switching unit has two separate channels, each of which is responsive to a pair of the antennas. The automatic gain control (AGC) voltages from each pair of receivers are fed to a respective switching tube, each switching tube selecting the strongest AGC voltage of a respective channel. The strongest AGC voltage of each channel operates via a relay a respective multivibrator on one side or the other, the particular side operated controlling one of a pair of cathode followers. The signal received by each receiver is fed to a respective one of the cathode followers so that the signal output of each channel depends upon which cathode follower is operated by the multivibrator. The channels are tied to an auxiliary circuit including two networks. Each network is responsive to a respective channel and receives therefrom the AGC voltages of its channel and the output of the multivibrator. The auxiliary circuit is responsive to the strongest signal output of each channel and feeds each to a respective amplifier. The greatest AGC voltage of each channel is selected by the networks and then the two strongest are fed to a switching tube. The switching tube selects the strongest of all the AGC voltages to control a multivibrator through a relay and the multivibrator actuates one or the other of the amplifiers to gate the strongest signal received by the antennas.

An object of the present invention is to provide a device which will determine the strongest signal out of at least four signals.

Another object is to provide a device which will more efficiently determine the strongest signal out of at least four signals, each signal being received by an antenna in diversity with the remainder of the antennas.

Other objects and many of the attendant advantages of this invention will be readily appreciated as the same becomes better understood by reference to the following detailed description when considered in connection with the accompanying drawings in which like reference numerals designate like parts through the figures thereof and wherein:

FIGS. 1*a* and 1*b* are schematic representations of the circuitry which is employed in the switching unit.

Referring now to the drawings wherein like reference numerals designate like or corresponding parts throughout the several views there is shown in FIG. 1*a* two channels, each channel being responsive to a pair of receivers. Each receiver is responsive to a respective antenna (not shown), the antennas being located in diversity with one another. Since the channels are identical, the following description will be directed toward channel 1. The signal received by receiver A is fed to a cathode follower tube 12 and the signal received by a receiver B is fed to another cathode follower tube 14. The automatic gain control voltage of each receiver is fed to the inputs of a switching tube 16 and the strongest AGC voltage which is negative in polarity cuts the respective side of the switching tube off enabling the opposite half of the tube to conduct and actuate a relay 18. The relay actuates an A side or a B side of a bi-stable multivibrator, such as a flip-flop multivibrator 20, and the multivibrator in turn feeds an intermediate voltage to the screen grid of one or the other of the cathode follower 12 or 14, the particular follower being fed depending upon which side of the multivibrator is actuated.

In FIG. 1*b*, gated amplifiers 22 and 26 perform the same function as tubes 12 and 14 of FIG. 1*a*. The AGC voltages of the receivers of channel 1 are fed to an upper network 29 of the circuit shown in FIG. 1*b* and the AGC voltages of the receivers of channel 2 are fed to a lower network 30 therein. Within the upper network, the AGC voltage of receiver A of channel 1 is fed to a contact 31 via a lead 32 and the AGC voltage of receiver B of channel 1 is fed to a contact 34 via a lead 36. In similar manner, the AGC voltage of channel 2 is fed to a contact 38 via a lead 40 and the AGC voltage of receiver B is fed to a contact 42 via a lead 44.

The contacts 31 and 34 in conjunction with a solenoid 46 form a polarized relay 48 of the upper network and the contacts 38 and 42 in conjunction with a solenoid 50 form a polarized relay 52 for the lower network. Channel 1 feeds an intermediate voltage (I.V.) to the coil of the solenoid 46 via a lead 54 and channel 2 feeds an intermediate voltage to the coil of solenoid 50 via a lead 56. The intermediate voltage of each channel is taken from one side of its multivibrator, this side indicating by a yes or no answer which side of the multivibrator is actuated. In the embodiment shown, the intermediate voltage is taken from the B side of the multivibrator of each channel so that if, for instance, receiver A of channel 1 was receiving the strongest signal, then a voltage of one value out of the B side of the multivibrator 20 would indicate that the A side of the multivibrator was actuated. And, accordingly, if receiver B of the same channel has the strongest signal, then still the B side of the multivibrator would indicate by a voltage of another value that the B side of the multivibrator is actuated. It follows, of course, that if the A side of the multivibrator is actuated that the A receiver has the strongest signal and if the B side of the multivibrator is actuated that the B receiver has the strongest signal.

Referring again to FIG. 1*b* the armature of the solenoid 46 of the upper network is mechanically linked to a center arm 58, this arm being disposed between the contacts 31 and 34. The armature of the solenoid 50 of the lower network is mechanically linked to a center arm 60, this arm being disposed between contacts 38 and 42. The intermediate voltage of channel 1 is fed to the coil of the solenoid 46 and the intermediate voltage for channel 2 is fed to the coil of the solenoid 50. The arms 58 and 60 pick up the strongest AGC voltage of their respective channel depending upon the polarization of the solenoids 46 and 50 by the intermediate voltages. The strongest AGC voltage of channel 1 is fed from the arm 58 to the grid of a cathode follower tube 61, and the strongest AGC voltage of channel 2 is fed from the arm 60 to the grid of a cathode follower tube 62. The cathode of the tube 61 biases a grid of a dual-triode switching tube 64 and the cathode of the tube 62 biases the other grid of the tube 64. The output of each triode of the switching tube 64 is fed to a respective end of a solenoid 66, the solenoid being a part of a polarized relay 68. The polarized relay also includes a center arm 70, the latter being disposed between a contact 72 representing channel 1 and a contact 74 representing channel 2.

The contact 74 is connected to a grid of one side of a bi-stable multivibrator 76 and the contact 72 is connected to a grid of the other side of the multivibrator, the arm 70 conducting a negative biasing voltage which is suitable for actuating the multivibrator through its grids. The armature of the solenoid 66 is mechanically linked to the arm 70 thus causing the arm to bias one side or the other of the multivibrator 76 depending upon the polarization of the solenoid 66 by the switching tube 64. When one side of the bi-stable multivibrator is cut-off by the negative biasing voltage fed to its grid via the center arm 70, a respective gated amplifier 22 or 26 will conduct due to an increase in the voltage on its screen, caused by the increase in voltage at the plate of the multivibrator in its non-conducting state. This produces an output at an out terminal 78 via capacitors 80 and 82, the signal received at the terminal 78 representing the strongest signal received by all four receivers contained in channels 1 and 2.

The left side of the multivibrator 76 is connected to an indicator light 84 and the right side of the multivibrator is connected to an indicator light 86 so that when either side has an output the respective indicator light will be energized and present a visual indication of which channel has the strongest signal.

A diode clamper 87 is used in a feedback circuit from one of the screen grids of the gated signal amplifier 26 to the input of the relay switching tube 64. After switching occurs in the relay switching tube this circuit maintains the gate conditions by the RC time constant of the feedback circuit. Any transient voltage of the gated amplifier screen grid is coupled back to the input of the relay switching tube in the proper polarity so as to increase the voltage which caused the switching action. The relay switching tube is controlled by the feedback circuit making it insensitive to fluctuations in the AGC signal voltage. The feedback time constant is made long enough so that AGC voltage changes will be within the response time of the relay.

The strongest data signal of channel 1 is fed to the grid of tube 22 via a variable resistor 88 and the strongest data signal received by channel 2 is fed to the grid of tube 26 via a variable resistor 90. Both of the resistors 88 and 90 are ganged together so that the grids of the tubes 22 and 26 can be balanced to give the same signal amplitude from either tube 22 or 26. Tube 91 is a cathode follower which couples the video signal from the gated amplifier tube to the output. The output impedance is approximately 200 ohms.

A diode 92 is connected between a constant power source and the screen of the gated amplifier tube 26 so as to clamp the screen to a constant voltage and a diode 94 is connected between the same constant power source and the screen of the gated amplifier tube 22 so as to clamp the screen of that tube to a constant voltage.

In the operation of the device, channel 1 alone is referred to since it is identical to channel 2. Each of the receivers of channel 1 receives a signal from a respective antenna. The signals received are each fed to one of the cathode followers 12 or 14 and the AGC voltage of the receivers are fed to a switching tube 16. The switching tube selects the strongest AGC voltage of the receivers within the channel, each of the strongest AGC voltages operating a respective multivibrator 20 through a relay 18. The multivibrator in turn operates one of the amplifiers 12 or 14, the amplifier being operated gating the strongest signal within the channel. The strongest signals (one from each channel) are then fed to a respective one of the gated amplifiers 22 and 26. The intermediate voltage of each channel is fed to a respective one of the polarized relays 48 and 52 to select the strongest AGC voltage of each channel. The strongest AGC voltage of each channel is then fed to a dual-triode switching tube 64. The polarized relay 66 is operated by the switching tube to energize one side or the other of the multivibrator 76, the side energized actuating one or the other of the tubes 22 or 26 to pass the strongest signal of channels 1 and 2 to the out terminal 78. The strongest signal that appears at the terminal 78 can be used for recording or any other type of analysis.

It is now readily apparent that the present invention has a greater capability by comparing the AGC voltages of previous channels within the circuit employing an intermediate voltage also of the previous circuitry and then using the greatest AGC voltage to pass the best data signal output of the previous channels. Any number of channels having any number of pairs of receivers and respective antennas can be operated under the same method, the present embodiment employing only two channels, each channel having two receivers.

Obviously many modifications and variations of the present invention are possible in the light of the above teachings. It is therefor to be understood, that within the scope of the appended claims, the invention may be practiced otherwise than as specifically described.

I claim:

1. In combination with a diversity switching unit including a plurality of channels, a plurality of receivers within each channel for receiving a signal in diversity, each receiver having an independent gain control circuit, a comparator within each channel responsive to the AGC voltages of the receivers of its channel for selecting the strongest AGC voltage of said receivers, a circuit within each channel coupled to a respective one of the comparators and responsive to the strongest AGC voltage of its channel for producing a single intermediate voltage, the intermediate voltage of each channel indicating by a yes or no answer which receiver of the channel is receiving the strongest signal and another circuit within each channel responsive to the intermediate voltage for gating the strongest signal of its channel; an auxiliary diversity switching unit comprising a plurality of networks, each network receiving the AGC voltages and the intermediate voltage from a respective channel, means within each network responsive to the intermediate voltage for selecting the strongest AGC voltage of the respective channel, means responsive to the selected AGC voltages for passing a biasing voltage to one of a plurality of paths representing said channels, and means responsive to the biasing voltage for gating the strongest signal of all of the channels whereby the strongest signal received by all the receivers is made available.

2. A combination as claimed in claim 1 wherein the means for selecting includes a first polarized relay having a longitudinal solenoid for actuating a center arm between a pair of contacts, said solenoid being energized by the intermediate voltage and the contacts being biased separably by the AGC voltages of a respective channel whereby the relay will select the greatest AGC voltage of the respective channel.

3. A combination as claimed in claim 2 wherein the means for passing the biasing voltage includes a second polarized relay actuated by a dual triode switching tube, each triode being responsive to the strongest AGC voltage of a respective channel, the second relay having a longitudinal solenoid for actuating a center arm between a pair of contacts, each contact corresponding to a respective channel, the arm being biased at a predetermined voltage and the contacts feeding said gating means, one end of the solenoid being responsive to one of the triodes of the switching tube and the other end of the solenoid being responsive to the other triode whereby one or the other of the contacts is biased to the predetermined voltage through said arm depending upon which channel has the strongest AGC voltage.

4. A combination as claimed in claim 3 wherein the means responsive to the biasing voltage for gating the strongest signal of all the channels includes a multivibrator having two sides, each side being responsive to a respective contact to the biasing voltage means and corresponding to a respective channel and each side feeding a respective gated amplifier, each gated amplifier being responsive to the strongest signal of a corresponding channel whereby the amplifier receiving the strongest signal is actuated by its respective side of the multivibrator and passes such signal to an output terminal.

5. A dual diversity switching unit comprising a plurality of channels, a plurality of receivers within each channel for receiving a signal in diversity, each receiver having an independent gain control circuit, a comparator within each channel responsive to the AGC voltages of the receivers of its channel for selecting the strongest AGC voltage of said receivers, a circuit within each channel coupled to a respective one of the comparators and responsive to the strongest AGC voltage of its channel for producing a single intermediate voltage, the intermediate voltage of each channel indicating by a yes or no answer which receiver of the channel is receiving the strongest signal and another circuit within each channel responsive to the intermediate voltage for gating the strongest signal of its channel to a respective gated amplifier, a polarized relay responsive to the AGC voltages and the intermediate voltage of a respective channel, the relays each having contacts each of which is responsive to an AGC voltage and further having a solenoid which is energized by an intermediate voltage from a respective channel, each solenoid being linked to a respective arm between the contacts, the arms collectively passing the strongest AGC voltage of a pair of channels to a dual triode switching tube, one triode of each switching tube coupled to one end of the solenoid of another polarized relay and the other triode of the switching tube coupled to the other end of the latter solenoid, the latter solenoid being linked to an arm which carries a biasing voltage, said latter arm being disposed between a pair of contacts, each of the latter contacts being coupled to a respective side of a multivibrator so that one side or the other thereof is actuated by said biasing voltage, each side of the multivibrator corresponding to a respective channel and coupled to a respective one of the gated amplifier whereby the gated amplifier receiving the strongest signal is actuated by its respective side of the multivibrator and passes the strongest signal to an output terminal.

References Cited by the Examiner

UNITED STATES PATENTS

| | | | |
|---|---|---|---|
| 2,004,126 | 6/35 | Moore | 325—304 |
| 2,282,526 | 5/42 | Moore | 325—304 |
| 2,514,162 | 7/50 | Peterson | 325—304 |
| 2,515,668 | 7/50 | Schock et al. | 325—304 |
| 2,572,912 | 10/51 | Bucher | 325—304 |
| 2,872,568 | 2/59 | Provaz | 325—370 |
| 2,966,585 | 12/60 | Schultz | 325—304 |

DAVID G. REDINBAUGH, *Primary Examiner.*

SAMUEL B. PRITCHARD, *Examiner.*